US00RE44142E

(19) United States
(12) Reissued Patent
Wilson

(10) Patent Number: US RE44,142 E
(45) Date of Reissued Patent: Apr. 9, 2013

(54) RADIO SCANNER PROGRAMMED FROM FREQUENCY DATABASE AND METHOD

(75) Inventor: Wayne K. Wilson, North Richland Hills, TX (US)

(73) Assignee: RadioShack Corporation, Fort Worth, TX (US)

(21) Appl. No.: 12/930,519

(22) Filed: Jan. 7, 2011

Related U.S. Patent Documents

Reissue of:
(64) Patent No.: 7,676,192
Issued: Mar. 9, 2010
Appl. No.: 11/314,392
Filed: Dec. 21, 2005

(51) Int. Cl.
*H04H 20/71* (2008.01)

(52) U.S. Cl. ..... 455/3.01; 455/3.03; 455/422.1; 455/456.1; 455/403; 725/38; 342/375.01

(58) Field of Classification Search ..... 455/3.01, 455/3.03, 3.04, 3.06, 422.1, 456.1, 403, 500, 455/517, 343, 466, 414.1; 725/38, 49, 52, 725/62; 342/357.01, 357.06, 357.09
See application file for complete search history.

(56) References Cited

U.S. PATENT DOCUMENTS

| | | | | |
|---|---|---|---|---|
| 4,476,582 | A | 10/1984 | Strauss et al. | |
| 4,521,915 | A | 6/1985 | Baker et al. | |
| 4,888,815 | A | 12/1989 | Ahlemeyer et al. | |
| 5,001,775 | A | 3/1991 | Hayashi et al. | |
| 5,163,161 | A | 11/1992 | Bowles et al. | |
| 5,276,518 | A | 1/1994 | Shimizu | |
| 5,448,702 | A * | 9/1995 | Garcia et al. | 710/100 |
| 5,483,684 | A * | 1/1996 | Ono et al. | 455/161.2 |
| 5,822,553 | A * | 10/1998 | Gifford et al. | 710/305 |
| 5,867,161 | A * | 2/1999 | Walsh | 715/808 |
| 5,946,635 | A | 8/1999 | Dominguez | |
| 6,272,088 | B1 * | 8/2001 | Aramaki et al. | 369/53.24 |
| 6,782,465 | B1 * | 8/2004 | Schmidt | 711/208 |
| 6,941,120 | B2 | 9/2005 | Barnett et al. | |
| 7,046,964 | B1 * | 5/2006 | Sullivan et al. | 455/67.11 |
| 7,136,664 | B1 * | 11/2006 | Cassidy et al. | 455/520 |
| 7,181,526 | B1 * | 2/2007 | Bell et al. | 709/231 |
| 7,224,409 | B2 * | 5/2007 | Chin et al. | 348/732 |
| 7,320,041 | B2 * | 1/2008 | Biran et al. | 710/29 |
| 7,359,641 | B2 * | 4/2008 | Dallesasse et al. | 398/135 |
| 7,477,872 | B2 * | 1/2009 | Fujii | 455/3.01 |
| 2002/0010941 | A1 * | 1/2002 | Johnson | 725/108 |
| 2002/0194081 | A1 * | 12/2002 | Perkowski | 705/26 |
| 2003/0208396 | A1 * | 11/2003 | Miller et al. | 705/14 |

(Continued)

OTHER PUBLICATIONS

Apple iPod User's Guide ("Apple"), http://support.apple.com/manuals#ipod, Sep. 1, 2004, 64 pages.

(Continued)

*Primary Examiner* — Wen Huang
(74) *Attorney, Agent, or Firm* — Dan Brown Law Office; Daniel R. Brown

(57) ABSTRACT

A scanning radio and method using a receiver, a channel memory and a display in conjunction with a frequency and linked descriptor database. The frequency and linked descriptor database is queried using a geographic reference to produce a list of local radio channels that includes a list of frequencies with linked descriptors. The list of radio channels is transferred into the channel memory of the scanner, and the receiver is sequentially tuned to the listed frequencies recalled from the list of radio channels while the corresponding linked descriptors are simultaneously displayed.

43 Claims, 13 Drawing Sheets

U.S. PATENT DOCUMENTS

| | | | | |
|---|---|---|---|---|
| 2004/0054822 | A1* | 3/2004 | Biran et al. | 710/15 |
| 2004/0054837 | A1* | 3/2004 | Biran et al. | 710/305 |
| 2004/0057380 | A1* | 3/2004 | Biran et al. | 370/235 |
| 2004/0198279 | A1* | 10/2004 | Anttila et al. | 455/179.1 |
| 2004/0198282 | A1* | 10/2004 | Heiderscheit et al. | 455/186.1 |
| 2004/0210479 | A1* | 10/2004 | Perkowski et al. | 705/14 |
| 2005/0289592 | A1* | 12/2005 | Vermola | 725/45 |
| 2006/0011716 | A1* | 1/2006 | Perkowski | 235/375 |
| 2006/0037060 | A1* | 2/2006 | Simms et al. | 725/119 |
| 2006/0104237 | A1* | 5/2006 | Ryu | 370/328 |
| 2006/0114350 | A1* | 6/2006 | Shimada et al. | 348/423.1 |
| 2006/0156006 | A1* | 7/2006 | Dietl et al. | 713/176 |
| 2007/0085739 | A1* | 4/2007 | Udall | 342/357.17 |
| 2007/0118853 | A1* | 5/2007 | Kreitzer et al. | 725/46 |
| 2007/0260628 | A1* | 11/2007 | Fuchs et al. | 707/101 |
| 2008/0005768 | A1* | 1/2008 | Sakai | 725/73 |
| 2008/0159220 | A1* | 7/2008 | Kitchin et al. | 370/329 |
| 2008/0168259 | A1* | 7/2008 | Biran et al. | 712/207 |
| 2008/0177464 | A1* | 7/2008 | Fuchs et al. | 701/202 |
| 2008/0201227 | A1* | 8/2008 | Bakewell et al. | 705/14 |
| 2008/0215524 | A1* | 9/2008 | Fuchs et al. | 707/1 |
| 2009/0037114 | A1* | 2/2009 | Peng et al. | 702/4 |

OTHER PUBLICATIONS

The Trunked Radio Information Homepage ("Trunked"), http://web.archive.org/web/20020607202813/www.trunkedradio.net/cgi-bin/display.pl, Jun. 7, 2002, 1page.

Win92 Download Page ("StarrsoftDownload"), http://www.web.archive.org/web/20040811193703/starrsoft.com/freeware/win92/default.asp, Aug. 11, 2004, 6 pages.

Win92 software sample screenshot ("StarrsoftScreen"), http://www.web.archive.org/web/20020923232812/starrsoft.com/freeware/win92/sshot.jpg, Sep. 23, 2002, 1 page.

Screenshot from Win92 software, v00.46, Jul. 25, 2004, 12:52 PDT showing "Scanner" menu items ("StarrsoftWin92"), 1 page.

Canon PowerShot G3 Digital Camera User Guide, CDI-E067-06F, 0303CH40.05 ("CanonCamera"), Dec. 31, 2002, 107 pages.

Canon PowerShot G3 Software Starter Guide, CDI-E071-02G, 0303CH81.1 ("CanonSoftware"), Dec. 31, 2002, 63 pages.

BC250D Scanner Owner's Manual, UBZZ01315ZA ("BC250D"), Dec. 31, 2002, 110 pages.

Web page: St. Louis Scanner Frequencies ("StLouisScanner"), www.web.archive.org/web/20040422211852/http:/myweb.accessus.net/~090/scan/stlfreq.html, Apr. 22, 2004, 25 pgs.

Web page: City of St. Louis Police Dept. Talkgroups, "10" Codes, Unit Identification Information and Notes ("StLouisPolice"), . . . . . http://www.web.archive.org/web/20040422210311/http:/myweb.accessus.net/~090/scan/stlcitypd10.html, Apr. 22, 2004, 9 pages.

Web page: Pozilla Police Call CD software review ("Pozilla"), http://web.archive.org/web/20011119160922/http://strongsignals.net/access/reviews/reviews.cgi . . . . . ?type=display&rtype=rev&class=soft&num=005, Nov. 19, 2001, 10 pages.

RadioShack Police Call, Frequency Guide, Codes, Maps, Trunking, 2004 Edition. vol. 3 & 4 ("PoliceCall"), Dec. 31, 2003, 580 pages.

UASD Data Base tab screenshot ("UASDDatabase"), Nov. 24, 2004, 1 page.

UASD System tab screenshot ("UASDSystem"), Nov. 24, 2004, 1 page.

UASD Write to Scanner process dialog screenshot ("UASDWrite"), Nov. 24, 2004, 1 page.

* cited by examiner

RADIO SCANNER PROGRAMMED FROM FREQUENCY DATABASE AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to scanning radio receivers. More particularly, the present invention relates to a system and method of programming a scanning radio receiver by querying a frequency and linked descriptor database using a geographic search reference.

2. Description of the Related Art

Scanning radio receivers are devices that sequentially tune through plural radio frequencies until a pertinent radio broadcast is detected, at which time the scanning radio receiver stops the scanning process and receives the detected radio broadcast, usually routing the detected audio signals to a loudspeaker or earphone. The detection of a signal causes the scanning radio receiver to open a squelch gate that couples the received signals to the loudspeaker. Once the broadcast ceases, the squelch gate closes and the scanning radio receiver resumes the frequency scanning process. Scanning radio receivers are also called scanning radios, or simply "scanners." Most scanners are capable of scanning several radio frequency bands. Examples of radio bands accessible with modern scanners are listed in Table 1.

TABLE 1

| | |
|---|---|
| HF Band | 25-29 MHz |
| VHF-Lo Band | 30-50 MHz |
| VHF-Hi Band | 144-174 MHz |
| UHF Band | 406-512 MHz |
| 800 MHz Band | 806-1300 MHz |

Radio frequency bands are defined by regulatory authorities, such as the Federal Communications Commission (FCC) in the United States. The list of bands above is not exhaustive, and those skilled in the art are familiar with other bands and numerous sub-bands within the listed bands. The nature of radio scanning is a real-time experience, as there are a great variety of radio communications active at any given instant in time, and, it is a matter of personal preference as to which kinds of communications are desirable, and deemed pertinent by any given user. Some popular kinds of communications include police, fire, emergency medical, weather, sports, aircraft, as well as others. The entities that conduct radio communications within these services are commercial, government, and private organizations that utilize radio systems configured for their particular needs, while remaining compliant with regulatory requirements. Several manufacturers make and sell radio systems that operate according to established standards or that are of a proprietary design. In such systems, one or more radio repeaters are typically employed. The repeaters enable fleets of radios to have broad area radio coverage by transmitting to and receiving from the radio repeaters, which receive and re-transmit ("repeat") signals from the fleets of radios. Scanning radios generally monitor and receive broadcasts from the transmit side of the repeaters in one of two types of systems, "conventional" radio repeater systems and trunked groups of repeaters ("trunking systems"). In both cases the scanner sequentially scans multiple channels, looking for interesting and desirable broadcasts in real time.

Fleet radios commonly employ some form of analog or digital squelch management, which are controlled with squelch "tones." These tones are detected by the fleet radios, and by scanners, and serve to open and close the receiver's squelch gate. In order to receive a conventional radio broadcast, a scanner must tune to the frequency of transmission, detect the presence of a predetermined squelch tone, and then open the squelch gate. During a scanning operation, plural frequencies are sequentially loaded into the receiver, and then briefly checked for the presence of an expected tone, which indicates the presence of a pertinent broadcast. When a matching broadcast is detected, scanning is ceased, the squelch gate opened, and the broadcast reproduced to the loudspeaker of the radio. Once the broadcast ceases, the lack of the tone causes the squelch gate to closes, and scanning is resumed.

Trunking systems comprise plural repeaters, typically numbering from 2 to 20, which are connected together and are shared by many radio fleets, thereby improving spectrum utilization efficiency. Control signaling is implemented in the trunked radio system radio protocol, which assigns frequencies and talk group codes in real time. These talk group codes direct the radio fleets as to which repeater frequencies to use in real time. In a typical conversation, the frequency of operation changes with every transmission. In order to scan a trunked system, the scanner must be programmed with all the frequencies of the trunked group and must be programmed with one or more talk group codes. One of the trunked repeaters may be assigned as a control channel, which is particularly monitored, looking for predetermined talk group codes that indicated desired broadcasts.

In prior art scanners, the user was responsible for gathering the needed frequencies, squelch tones, and talk group ID codes. These are then meticulously entered into the scanner using the keypad. This approach is tedious and prone to errors, some of which might never be detected, leading to missed reception opportunities. In addition, the user had to be familiar with the concepts of trunked versus conventional scanning, the arrangement and allocation of channels in the memory of the scanner, which is particularly complex in the case of trunked systems because of the storage of both radio frequencies and talk group codes. Additionally, since radio signals have limited range and since radio frequencies are reused over large distances, the user had to find frequencies, tones, and codes utilized in their geographic area before programming the operation of the scanner. Lists of frequencies, tones, and codes are available from a few sources on the Internet. While this simplifies the process of finding frequencies, tones and codes, the process of gathering, selecting, and programming still remains daunting, even to relatively sophisticated users. In prior art scanners, the display was used to indicate the present frequency of reception by displaying a numeric representation of the current frequency, tone or code. This approach was confusing to users because it is difficult to remember what service is using particular frequencies, etc. Some prior art scanners enabled to user to enter alphanumeric phrases that correspond to the service, and operated such that the phrase was displayed during reception. While this is an improvement during operation and reception of the scanner, it made the programming task even more difficult, particularly since most scanners merely had a telephone style numeric keypad. Thus it can be appreciated that there is a need in the art for a significantly simpler system and method of programming frequencies, tones and codes into a radio scanner that adapts to the geographic needs of the user and that provides recognizable indications of what service is being received.

SUMMARY OF THE INVENTION

The need in the art is addressed by the apparatus and methods of the present invention. The present invention teaches a method of operating a radio having a receiver, a channel memory and a display in conjunction with a frequency and linked descriptor database. The method includes querying the frequency and linked descriptor database using a geographic reference to produce a list of local radio channels that includes a list of frequencies with linked descriptors. It also includes transferring the list of radio channels into the channel memory, and, tuning the receiver to a frequency recalled from the list of radio channels while simultaneously displaying a descriptor linked to the frequency.

In a specific embodiment of the method, the geographic reference is selectively specified. In another embodiment, the method includes selectively enabling a portion of the list of local radio channels for transfer. In another embodiment, the radio includes a database memory containing the frequency and linked descriptor database. In another embodiment, the frequency and linked descriptor database is located on the Internet, and the querying step and the transferring step are accomplished through an Internet connection.

In a specific embodiment of the foregoing method includes coupling the radio to a communication port on a computer, and the transferring step occurs between the computer and the radio. In a refinement to this embodiment, the frequency and linked descriptor database is located on a network coupled to the computer, and, the query is accomplished by the computer through the network. In another embodiment, the radio includes a rechargeable battery, and the method further includes recharging the battery through the communications ports. In another embodiment, the computer includes a user interface, and the method further includes specifying the geographic reference through the computer user interface. In another embodiment, the radio is provided with a computer device driver and the method includes loading the device driver onto the computer and recognizing the connection of the radio to the computer by the device driver. In a further embodiment, the radio is provided with computer application software and the method includes loading the application software onto the computer and executing the application software on the computer. In another embodiment, the frequency and linked descriptor database is stored in the computer.

The present invention also teaches a radio apparatus for use in conjunction with a frequency and linked descriptor database. The apparatus includes a receiver, a channel memory, and a display, all of which are coupled to a controller. The controller operates to store a list of local radio channels that includes a list of frequencies with linked descriptors, which result from a query of the frequency and linked descriptor database using a geographic reference, into the channel memory. The controller further operates to tune the receiver to a frequency recalled from the list of radio channels and simultaneously display a descriptor linked to the frequency on the display.

In a specific embodiment of the apparatus, the geographic reference is communicated through the controller during the query of the frequency and linked descriptor database. In another embodiment, the apparatus further includes an actuator coupled to the controller. Actuation of the actuator causes the controller to enable a selective portion of the list of local radio channels to be stored in the channel memory. In another embodiment, the apparatus further includes a database memory coupled to the controller, which contains the frequency and linked descriptor database. In another embodiment, the frequency and linked descriptor database is located on the Internet, and the apparatus additionally includes a network interface. The controller operates to query the frequency and linked descriptor database through the network interface, and operates to receive the list of local radio channels trough the network interface.

In another specific embodiment of the apparatus, it is adapted for use in conjunction with a computer having a communication port. The apparatus further includes an interface port coupled to the controller and adapted to communicate with the computer communication port. The controller receives the list of local radio channels from the computer through the interface port. In another embodiment, the apparatus includes a battery that is electrically coupled to the interface port, and the battery is recharged with power received from the computer communication port. In another embodiment of the apparatus, the frequency and linked descriptor database is stored in the computer. In another embodiment, the apparatus is provided with application software adapted for execution by the computer. The application software operates to recognize the radio upon connection of the interface port to the communication port. In another embodiment, the frequency and linked descriptor database is located on a network coupled to the computer, and the application software operates to cause the computer to query the frequency and linked descriptor database through the network. In yet another embodiment, the computer includes a user interface, and the application software recognizes user input of the geographic reference through the user interface.

The present invention also teaches a method of operating a scanning radio, which has a receiver, a channel memory and a display, in conjunction with a frequency and linked descriptor database. The method includes querying the frequency and linked descriptor database using a geographic reference to produce a list of local radio channels that includes a list of frequencies with linked descriptors. It also includes transferring the list of local radio channels into the channel memory, and scanning the list of local radio channels by sequentially tuning the receiver to frequencies recalled from the list of frequencies stored in the channel memory while simultaneously displaying a descriptor linked to each of the recalled frequencies.

In a specific embodiment of the foregoing method, the scanner further includes a channel selection actuator, and the method further includes selectively enabling a portion of the list of local radio channels for sequential tuning during the scanning step. In another embodiment, the frequency and linked descriptor database further includes linked squelch tones, and the list of local radio channels further include a linked squelch tone that is linked with at least a first frequency. The scanning step further includes comparing a presently received squelch tone with the linked squelch tone, and enabling reception of a present frequency upon detecting a match between the received squelch to and the linked squelch tone.

In another specific embodiment of the method, the frequency and linked descriptor database further includes trunked groups of frequencies and linked system types, and the list of local radio channels further include a trunked group of frequencies and a linked system type. The scanning step further includes enabling reception of the trunked group of frequencies according to a trunking protocol corresponding to the linked system type. In a further refinement, the frequency and linked descriptor database includes linked trunked group codes, and the list of local radio channels further includes a linked trunked group code linked to the trunked group of frequencies. The scanning step further includes comparing a presently received trunked group code with the linked trunked group code, and enabling reception of a trunked system radio signal by tracking the trunked group frequencies in accordance with the trunking protocol upon detecting a match between the received trunked group code and the linked trunked group code. The method treats talk group ID codes, whole trunked systems and conventional frequencies as individual "things" to be scanned by the user.

In another embodiment of the method, the scanner further includes an interface port and is operated in conjunction with a computer having a communications port, the method further includes coupling the scanner interface port to the computer communication port. The transferring step transfers the list of local radio channels from the computer to the channel memory. In another embodiment, the frequency and linked descriptor database is located on a network coupled to the computer, and the querying step is initiated by the computer through the network. In another embodiment, the method further includes selectively enabling a portion of the list of local radio channels for transfer during the transferring step. In another embodiment, the scanner includes a battery electrically coupled to the interface port, and the method includes recharging the battery with power derived from the communications port.

In another specific embodiment of the method, the radio is provided with a computer device driver, and the method further includes loading the device driver onto the computer, and recognizing the connection of the radio interface port to the computer communication port by the device driver. In another specific embodiment, the frequency and linked descriptor database is stored in the computer. In another embodiment, the method further includes synchronizing the list of local radio channels in the computer with the present list of local radio channels in the channel memory.

In a refinement to the foregoing method, the computer includes a user interface and the method includes specifying the geographic reference through the computer user interface. In another embodiment, the method further includes selectively enabling a portion of the list of local radio channels for transfer during the transferring step by access to the computer user interface. In another refinement, the method includes presenting an indicia of the content of the list of local radio channels using the computer user interface, and initiating the transferring step by affirmative actuation using the computer user interface. In another embodiment, the radio is provided with computer application software, and, the method further includes loading the application software onto the computer and executing the application software on the computer. In yet another refinement, the computer application software enables selecting, adding, and deleting content from the list of local radio channels.

The present invention also teaches a scanning radio apparatus for use in conjunction with a frequency and linked descriptor database. The apparatus includes a receiver, a channel memory, and a display, all of which are coupled to a controller. The controller operates to store a list of local radio channels into the channel memory. The list of local radio channels includes a list of frequencies with linked descriptors, which result from a query of the frequency and linked descriptor database using a geographic reference. The controller further operates to sequentially tune the receiver to frequencies recalled from the list of frequencies stored in the channel memory while simultaneously displaying a descriptor linked to each of the recalled frequencies on the display, thereby scanning the list of frequencies.

In a specific embodiment, the scanning radio apparatus further includes a channel selection actuator coupled to the controller. Actuation of the channel selection actuator causes the controller selectively enable a portion of the list of local radio channels for sequential tuning during the scanning the list of frequencies operation. In another embodiment of the apparatus, the frequency and linked descriptor database further includes linked squelch tones, and the list of local radio channels further include a linked squelch tone that is linked with at least a first frequency. The controller stores the linked squelch tone in the channel memory, and compares a presently received squelch tone with the linked squelch tone during the scanning operation. The controller enables reception of a present frequency upon detecting a match between the received squelch to and the linked squelch tone.

In another specific embodiment of the apparatus, the frequency and linked descriptor database further includes trunked groups of frequencies and linked system types, and the list of local radio channels further includes a trunked group of frequencies and a linked system type. The controller stores the trunked group of frequencies and the linked system type in the channel memory, and enables reception of the trunked group of frequencies by the receiver according to a trunking protocol corresponding to the linked system type. In a refinement to this embodiment, the frequency and linked descriptor database further includes linked trunked group codes, and the list of local radio channels further includes a linked trunked group code linked to the trunked group of frequencies. The controller compares a presently received trunked group code with the linked trunked group code during the scanning operation, and enables the receiver to receive a trunked system radio signal by tracking the trunked group frequencies in accordance with the trunking protocol upon detecting a match between the received trunked group code and the linked trunked group code.

In a specific embodiment, the apparatus is adapted for use in conjunction with a computer having a communication port. The apparatus further includes an interface port coupled to the controller and adapted to communicate with the computer communication port. The controller receives the list of local radio channels from the computer through the interface port. In another embodiment, the frequency and linked descriptor database is stored in the computer. In another specific embodiment, the apparatus further includes a battery electrically coupled to the interface port, and, the battery is recharged with power received from the computer communication port.

In a specific embodiment of the scanning radio apparatus further includes application software adapted for execution by the computer. The application software operates to recognize the radio upon connection of the interface port to the communication port. In another embodiment, the frequency and linked descriptor database is located on a network coupled to the computer. The query of the frequency and linked descriptor database is initiated by the computer through the network. In another embodiment, the controller and the application software synchronize the list of local radio channels in the computer with the present list of local radio channels in the channel memory. In another embodiment, the computer includes a user interface, and the geographic reference is specified through the computer user interface. In another embodiment, a portion of the list of local radio channels is selectively enabled for transfer by the application software through interface with the computer user interface.

In another embodiment, the application software presents an indicia of the content of the list of local radio channels using the computer user interface, and the transfer of the list of local channels to the channel memory occurs upon an affirmative actuation using the computer user interface. In yet another embodiment, the application software enables selecting, adding, and deleting content from the list of local radio channels.

DESCRIPTION OF THE INVENTION

Figure 1:
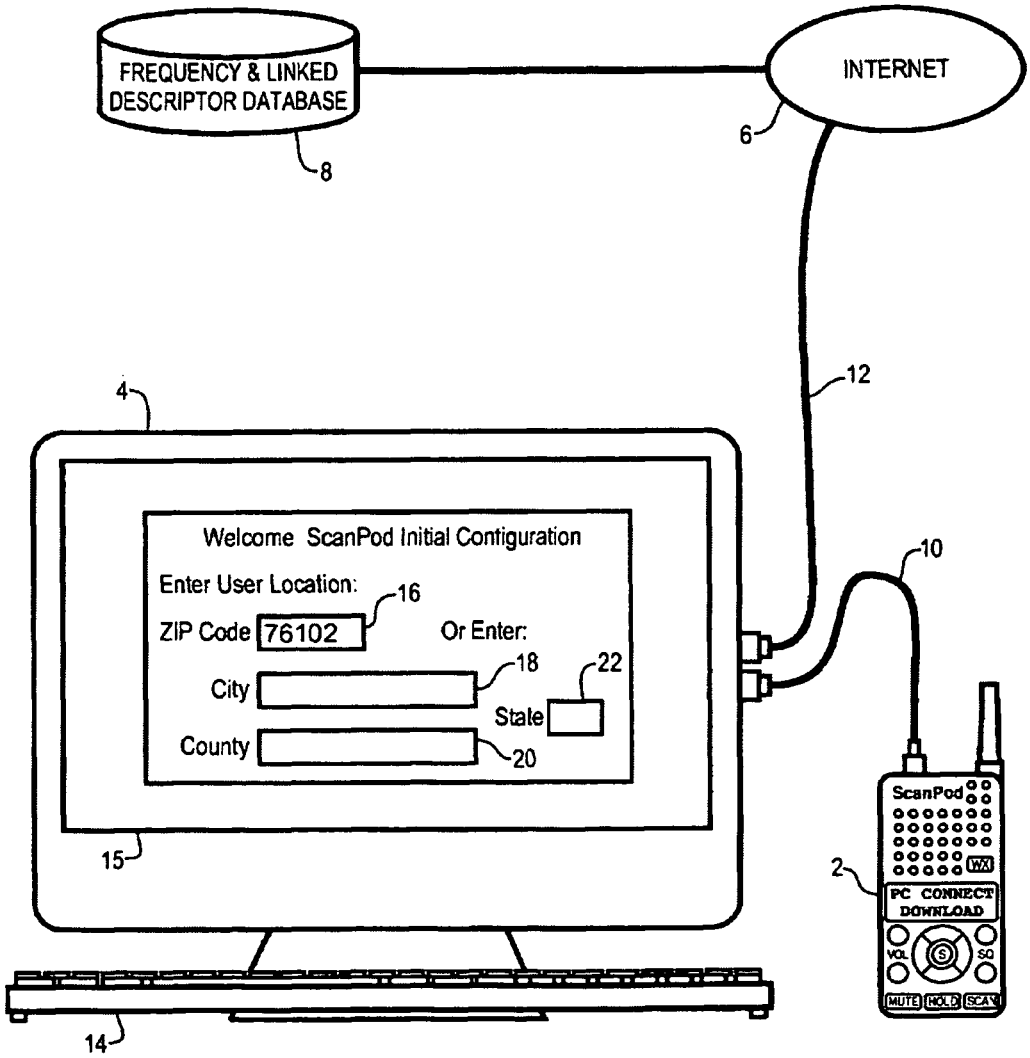
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The present invention advances the art by providing an apparatus and method for greatly simplifying the process of finding interesting radio channels and programming them into a radio scanner. Through advantageous use of the teachings herein, users are no longer responsible for gathering the needed frequencies, squelch tones, and talk group codes during radio programming. The user is no longer required to meticulously enter such information into the scanner using the limited keypad typically employed. Furthermore, in the case of radio scanners compatible to receive trunked system broadcasts, users no longer need to familiarize themselves with the concepts of trunked versus conventional scanning, the arrangement and allocation of channels in the memory of the scanner, which is particularly complex in the case of trunked systems. The teachings of the present invention advantageously utilize existing database listings of frequencies, tones, and codes that are already available, with some accessible through the Internet.

The apparatus of one illustrative embodiment of the present invention has been named the "ScanPod", which is a stylized contraction of the words "scanner" and "pod." The term "pod" is appropriate for this embodiment because of the remarkably compact size and convenient shape of the product, which is distinctly difference from larger prior art radio scanners. The illustrative embodiments of the invention is directed to a USB port programmable scanner with a two-line, sixteen digit, or other suitably sized, display. Simplified user interface controls are provided, and include volume up-down, squelch up-down, scan, manual, service search, weather and other key actuators. The scanner of the illustrative embodiment is small, compact, and includes a high quality rechargeable battery with long charge cycle life, which is recharged through the USB port. Menu based control operation is provided using directional keys to navigate through a displayed menu system. So as to eliminate the requirement to remember discrete frequencies, textural descriptors are linked to discrete frequencies, to trunked systems, and to trunking system talk group identities. The textural descriptors are displayed by the scanner, and enable to user to select and deselect interesting and desirable radio channels by references to the descriptors alone, with no need to remember frequencies, tones or codes. In one mode of operation, all of the communications on a trunking system can be monitored, and this is referred to as "open mode" monitoring, in which a global list of talk group ID codes are enabled for reception. During scanning operation, the linked descriptor to the currently received communications is displayed, so that the user can quickly determine what service is active at any given moment.

The ScanPod illustrative embodiment is implemented without a numeric keypad, as was required in prior art scanner designs. This approach allows designers to make the product considerable smaller and more convenient to carry. This is possible because the product is programmed via PC computer download process using a software application supplied with the product. The application software is installed in the user's computer and is launched when the product is coupled to a communication port in the computer. A device driver detects the connection. On its initial launch, the application software prompts the user to enter their local ZIP Code or other geographic reference. The ZIP Code is used as a search parameter in a database look-up process. The search result is a list of local radio channels, which are automatically downloaded into a channel memory in the scanner product. The database search is configured to produce results most likely to be of interest to typical users and customers, and may include radio services such as police, fire, emergency, air traffic control, marine, ham, and others. The application software offers the user options to tailor the results in a number of ways. In one mode, the user can add or delete frequencies to personalize the programming of the ScanPod product. In addition to discrete frequencies, the list of local channels may include squelch tones, trunked systems with trunked group codes, and textural descriptors for each search result. In alternative embodiments, the database query is targeted to other specific user interests and service types, including race frequencies, digital trunking systems, 800 MHz systems, as well as UHF and VHF channels.

In another embodiment of the invention, the user loads a software driver into their personal computer and then couples the ScanPod product to the computer via a USB interface. The software is automatically launched, which prompts the user for a geographic reference, such as a ZIP code, city/state or county/state description. The geographic reference is coupled to a geographic server out on the Internet, which queries a frequency and linked descriptor database for local radio channel information. In a simple embodiment, the server merely downloads all of the frequencies, tones and codes for the county identified by the user. Once the information is stored into the ScanPod product, the user can scroll through a list of textural descriptors, enabling and disabling entries based on their monitoring desires. In other embodiments of the invention, the user can be offered menu choices on the personal computer screen interface to narrow down the number of listening options. This is useful in crowded urban environments, where the number of entries on the channel scan list can be overwhelming. Additionally, the application software provides for manual entry of channels not found in the database, as well as automatic periodic updates.

Reference is directed to FIG. 1, which is a system diagram according to an illustrative embodiment of the present invention. The system consists of the radio scanner 2 and a personal computer 4, which has access to the Internet 6. Application software is supplied with the scanner 2 that is installed on the computer 4. The computer includes a display 15 and a keyboard user interface 14. When the scanner 2 is coupled to the computer 4 via a USB cable 10, an initial configuration screen 15 is presented. The user is prompted to enter a local geographic reference, which may be the user's ZIP code 16, the city 18, the county 20 and the state 22. The geographic reference is used as a database search parameter, which is coupled to the Internet 6 via interface 12. A frequency and linked descriptor database 8 exists on the Internet, and is searched to produce a list of local radio channels, which are returned to the computer 4. The computer 4, in turn, downloads the list of local radio channels to a channel memory (not shown) in the scanner 2. While the scanner is coupled to the computer, electric power is drawn through the USB cable 10 to charge the batteries (not shown) in the scanner 2. Once the local list of channels has been downloaded into the scanner 2, the scanner is separated from the computer 2 for portable operation.

Figure 3:
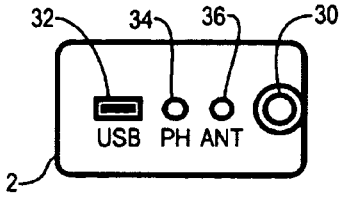
FIG. 3 is a top view of a radio scanner according to an illustrative embodiment of the present invention.
Figure 4:
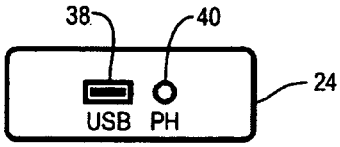
FIG. 4 is a bottom view of a radio scanner according to an illustrative embodiment of the present invention.
Figure 2:
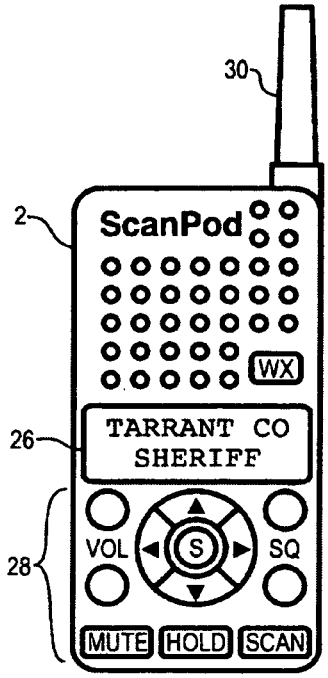
FIG. 2 is a front view of a radio scanner according to an illustrative embodiment of the present invention.

Reference is directed to FIG. 2, which is a front view of a radio scanner 2 according to an illustrative embodiment of the present invention. The scanner 2 illustrates the relative small size of the device, which includes an antenna 30, a two-line alphanumeric display 26, and a limited number of key actuators 28. The user interface of the scanner will be more fully described hereinafter. FIG. 3 is a top view of the same illustrative embodiment scanner 2. The antenna 30 is shown together with the electrical interfaces. The electrical interfaces include a USB serial port connector 32, a headphone jack 34, and an external antenna connector 36. FIG. 4 is a bottom view of an alternative embodiment radio scanner according to an illustrative embodiment of the present invention. The scanner 24 is FIG. 4 is configure in the same shape factor as a popular MP3 music player, known commercially as an Apple Computers, Inc. iPod™. The electrical connectors, which include a USB port connector 38 and a stereo phone jack 40 comply with the electrical and physical configuration of the iPod™ product. This design approach is advantageous because it gives users access to a broad range of iPod™ compatible accessories, such as loudspeaker docking stations, power supplies, and so forth. The assignee of the present invention is a supplier of iPod™ compatible accessories.

Figure 5:
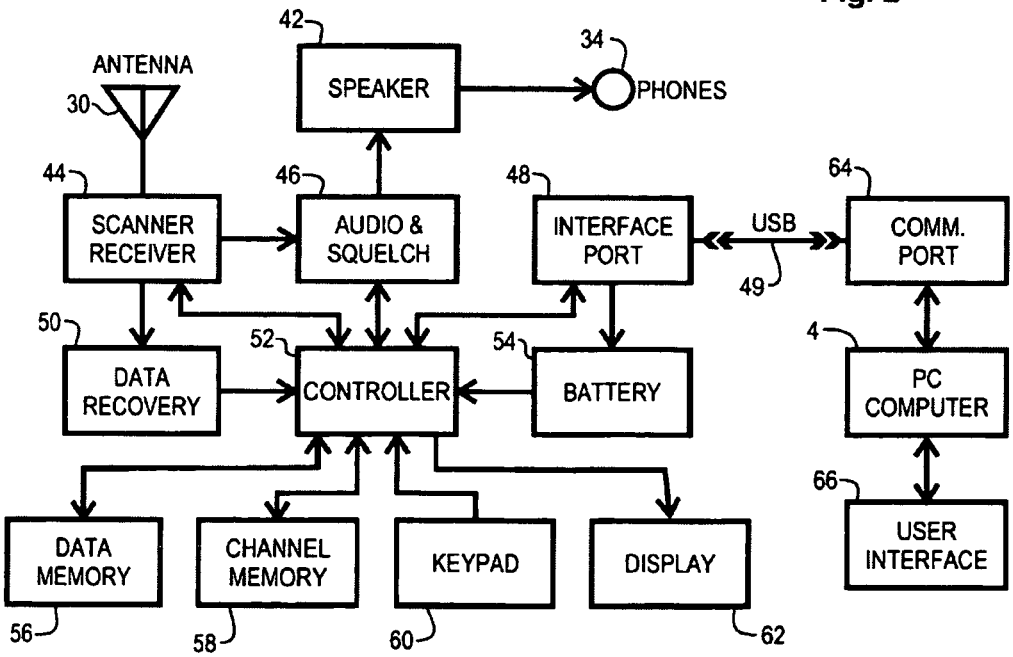
FIG. 5 is a functional block diagram of a radio scanner according to an illustrative embodiment of the present invention.

Reference is directed to FIG. 5, which is a functional block diagram of a radio scanner coupled to a computer according to an illustrative embodiment of the present invention. The scanner includes a scanning receiver 44, which is a digitally programmable PLL type found in many modern scanning receivers. A controller 52 provides a phase locked loop ("PLL") divisor to the receiver 44, which enables the controller 52 to selectively tune the frequency of reception of the receiver 44. Such tuning arrangements are known to those skilled in the scanning receiver arts. The controller 52 may be any of the type known to those skilled in the art to be suitable for operation and control of a battery powered portable device. An antenna 30 provides an RF radio signal to the scanning receiver 44. A data recovery circuit 50 is coupled to the base band output of the receiver 44, which is used to recover digitally encoded information in the received signal, such as digital squelch tones, sub-audible data, and control channel data in trunked systems. Such data recovery circuits are known to those skilled in the art. An audio amplifier and squelch circuit 46 receives a demodulated audio band signal from the scanning receiver 44. The squelch gate in circuit 46 operates under control of controller 52. Thus, the controller is enabled to receive squelch information from the received signals using the data recovery circuit 50, and to gate the received audio through the squelch gate 46 to a loud speaker 42 when a match is found between a previously stored tone or code and a presently received code or tone. A headphone jack 34 is provided, which enables users to listen privately, if desired.

The controller 52 is coupled to a display 62 and a keypad matrix 60. The display 62 in the illustrative embodiment is a two-line, sixteen-character liquid crystal display, however any suitable display technology and configuration may be employed. The keypad 60 in the illustrative embodiment is a limited function type, which is scanned by the controller 52 to detect user actuations thereof. The controller 52 is further coupled to a channel memory 58 and a data memory 56. The channel memory 58 is a random access memory that stores the local list of radio channels, which may include frequencies, squelch tones, trunked system frequency lists, trunked system type descriptors, trunked system talk group codes, and textural descriptors, all of which are linked in various ways described elsewhere herein. The data memory 56 is also a random access memory that is used for storage of the object code software that embodies the functional aspects of the scanner and other variable and data storage purposes, including the optional use of storing the entire frequency and linked descriptor database. The interface port 48 is also coupled to controller 48. In the illustrative embodiment, the interface port 48 is a universal serial port ("USB") version 2.0 compliant port, however any suitable interface port may be employed. A high quality lithium ion battery 54 powers the entire scanning radio receiver. The battery 54 is coupled to receive electrical power from the interface port, which is used to recharge the battery 54 while the interface port 48 is coupled to another communication port 64 that is operable to source power to connected devices.

The scanning receiver illustrated in FIG. 5 is coupled to a personal computer 4, such as an IBM PC compatible type computer, using a USB cable 49 through a communication port 64 in the computer 4. The computer 4 also includes a convention user interface, including a keyboard (not shown) and display (not shown). Thus, the controller 52 in the scanner is enabled to communicate with the computer 4 using the interface port 48 and communication port 64. The communication process includes receiving a list of local radio channels that results from a database query based on an input geographic reference. The computer 4 runs application software and device driver software that are bundled with the scanning radio product. When the user receives the scanner, the software is loaded onto the computer 4 by conventional means. At the time the USB cable 49 is coupled between the scanner and the computer 4, the device driver recognizes the connection and enables communication there between. The operation and design for such device drivers are known to those skilled in the art. The application software presents a series of display screens to the user for selection and operation of the software and scanner. The application software presents an initialization screen, which has already been described with reference to FIG. 1. In the initialization screen, the user is prompted to provide a geographic reference.

Figure 6:
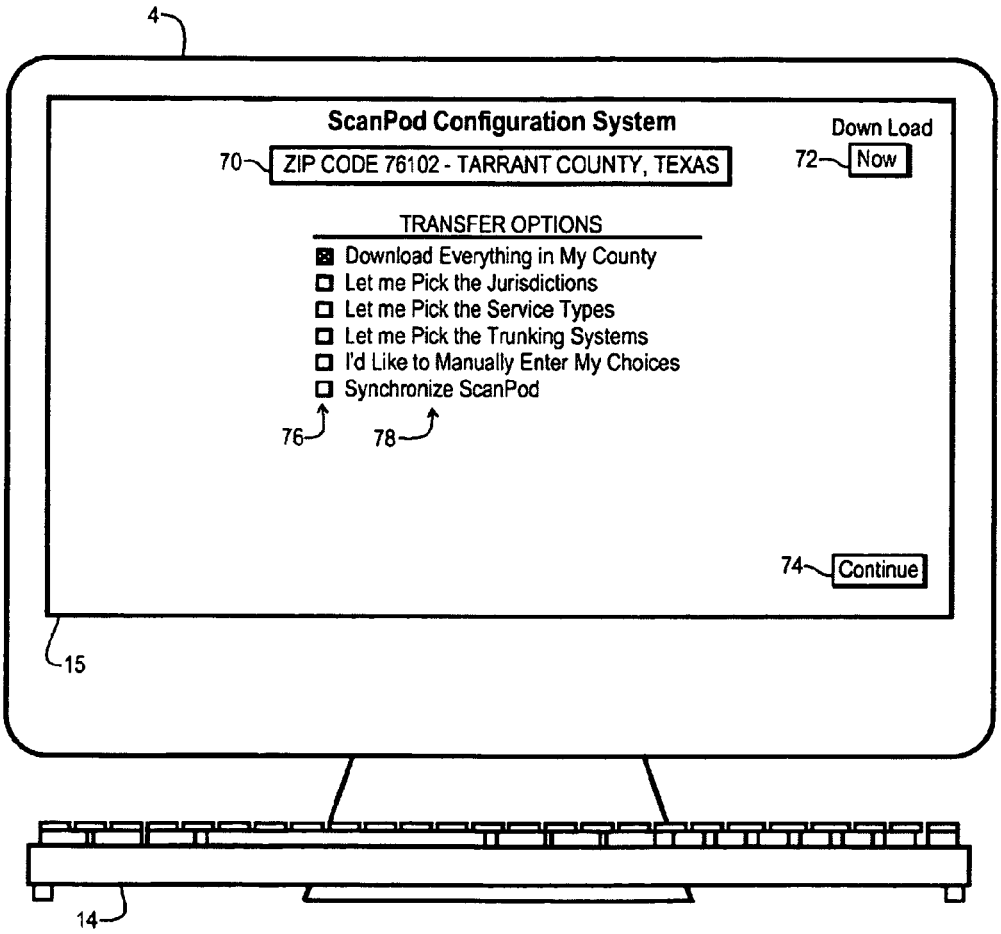
FIG. 6 is a display drawing of the computer based user interface according to an illustrative embodiment of the present invention.

Reference is directed to FIG. 6, which is a display 15 drawing of the computer 4 based user interface according to an illustrative embodiment of the present invention. FIG. 6 illustrates a user options screen provided by the application software on the screen 15 of the computer 4, which accepts inputs from the user via keyboard 14. After completion of the initialization screen, where the user enters the geographic reference, a database search is conducted based on that geographic reference. The results of that search is a list of local radio channels, which may include one of more discrete frequencies, squelch tones, talk group codes, and linked textural descriptors. All of this information is received by the computer 4. The user is offered several options about how this information is to be transferred into the scanner with the screen presented in FIG. 6. The screen first presents the local geographic area in box 70, which is ZIP code 76102 for Tarrant Co. Texas in this illustration. A list of TRANSFER OPTIONS 78 is provided together with a column of check boxes 76 used by the user to select the desired option. A "Continue" option 74 is provided, which may be selected to cause the software application to execute the selected option and advance to the next screen. In addition, a "Down Load Now" option 76 is presented, which causes the application software to transfer the selected option to the scanner immediately. Both of these options are repeated on many of the following user interface screens for simplicity and consistency of operation of the application software.

The TRANSFER OPTIONS presented by the application software in FIG. 6 include simply downloading all of the database query results as the first option. This is the simplest option for the user and will be satisfactory in many applications. However, in some urban jurisdictions, this may result in too great a number of radio channels. Accordingly, the application software offers several limiting selections. These include picking specific jurisdictions, such as the cities or governmental agencies. Another option is to select based on service type, such as police, fire, aircraft, etc. Another way to limit is to pick specific trunking systems available in the local geographic area. There are two other options offered in the TRANSFER OPTIONS, and these include manual entry of frequencies and services not otherwise provided from the database, and a synchronization function. The synchronization function compares the current content of the channel memory in the scanner with the most recent database query results. From time to time, new frequencies and services come on line and are added to the database, and this option allows the user to update the channel memory in the scanner over time.

Figure 7:
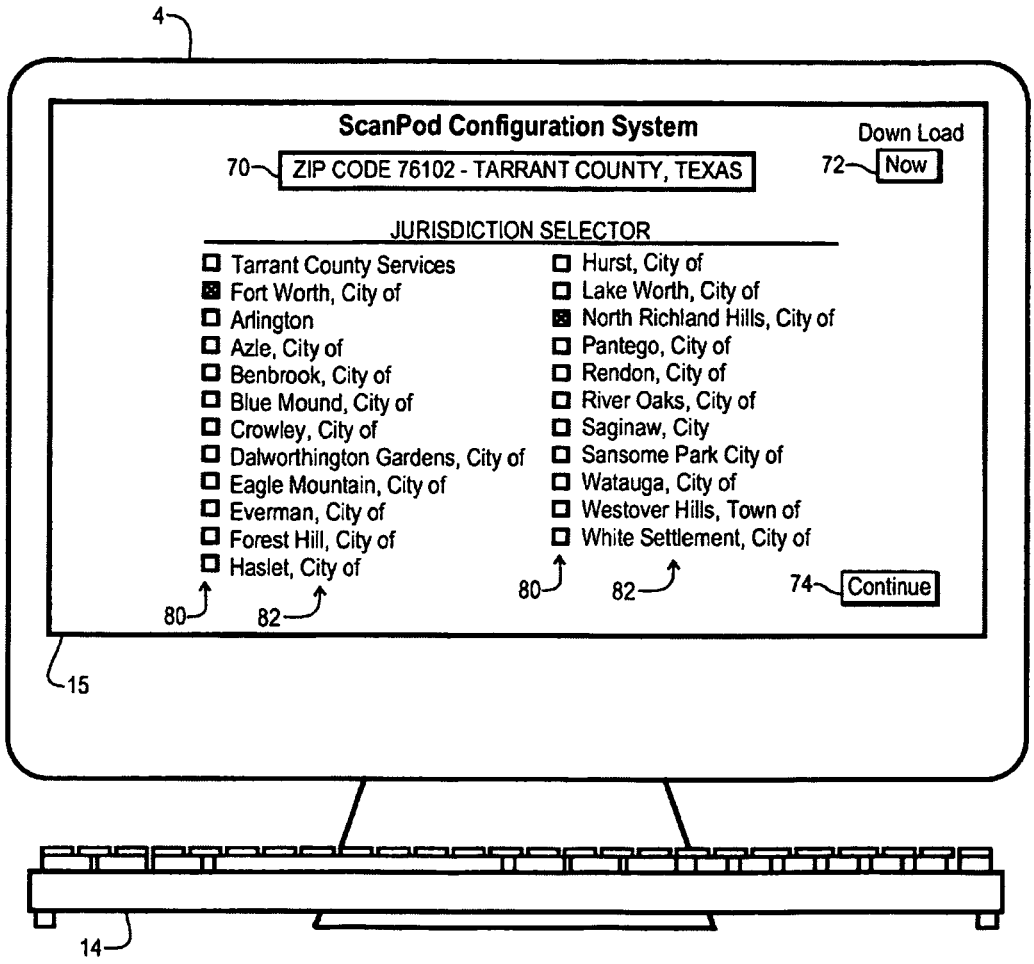
FIG. 7 is a display drawing of the computer based user interface according to an illustrative embodiment of the present invention.

Reference is directed to FIG. 7, which is a display 15 drawing of the computer 4 based user interface according to an illustrative embodiment of the present invention.

FIG. 7 illustrates a user options screen provided by the application software on the screen 15 of the computer 4, which accepts inputs from the user via keyboard 14. FIG. 7 illustrates the JURISDICTION SELECTOR, which enables the user to select a subset of all the jurisdictions available in the local geographic area. The JURISDICTION SELECTOR screen is presented only if the user has made that selection in the TRANSFER OPTIONS screen, discussed above. The example in FIG. 7 is for Tarrant County Texas, which include Fort Worth and a number of suburban communities. The jurisdictions are listed 82 in tabular form with corresponding selections boxes 80 provided of selection by the user. In the example, the user has selected the City of Fort Worth and the City of North Richland Hills. When the Continue option 74 is selected, the application software will limit the subsequent transfer of local channel information to just those services linked with the selected jurisdictions. Only channels from these jurisdictions will be transferred to the scanner.

Figure 8:
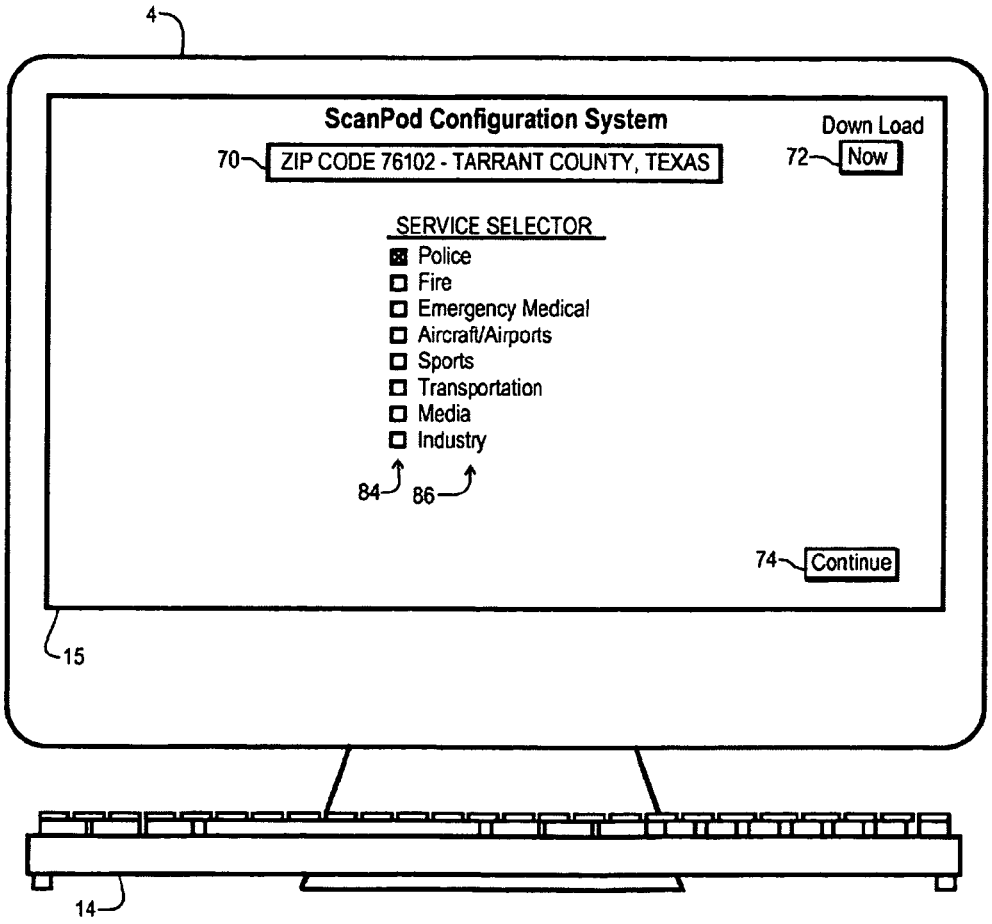
FIG. 8 is a display drawing of the computer based user interface according to an illustrative embodiment of the present invention.

Reference is directed to FIG. 8, which is a display 15 drawing of the computer 4 based user interface according to an illustrative embodiment of the present invention. FIG. 8 illustrates a user options screen provided by the application software on the screen 15 of the computer 4, which accepts inputs from the user via keyboard 14. FIG. 8 illustrates the SERVICE SELECTOR screen, which is offered only if the user made the selection in the TRANSFER OPTIONS screen, discussed above. The SERVICE SELECTOR screen offers a list of service types 86 and a corresponding column of selection boxes 84. In the illustrative embodiment, service types include police, fire, EMS, aircraft, sports, transportation, media, and industry. In the example, the user has selected police, and therefore only radio channels identified as police services will be transferred to the scanner with the download option 72 is initiated.

Figure 9:
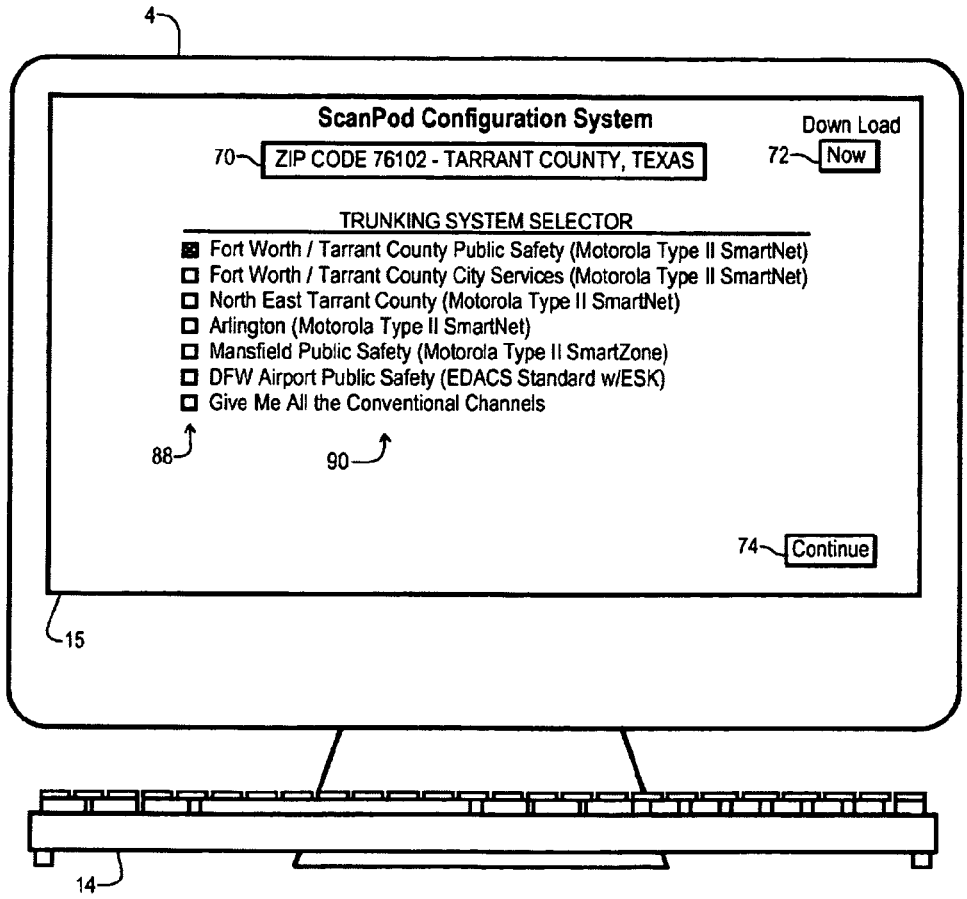
FIG. 9 is a display drawing of the computer based user interface according to an illustrative embodiment of the present invention.

Reference is directed to FIG. 9, which is a display 15 drawing of the computer 4 based user interface according to an illustrative embodiment of the present invention. FIG. 9 illustrates a user options screen provided by the application software on the screen 15 of the computer 4, which accepts inputs from the user via keyboard 14. FIG. 9 illustrates the TRUNKING SYSTEM SELECTOR screen, which is presented only if the corresponding option was enabled on the TRANSFER OPTIONS screen, discussed above. Trunking systems represent a distinct type of communications in that a given trunked system may carry communications for several services types. In addition, some trunking systems are privately owned and only carry communications for the particular owner, such as an industrial complex, railroad, etc. Thus, it is a useful way to limit the list of local radio channels transferred to the scanner by enabling and disabling trunking system as a whole. Additionally, frequency databases typically provide lumped information identifying the list of discrete trunking frequencies in a trunking system, trunking system type, and textual descriptors, as well as individual talk group codes with descriptors. Thus, the list of local trunking systems 90 is presented together with a corresponding column of selection boxes 88 in FIG. 9. In the example of FIG. 9, the user has enabled the Fort Worth and Tarrant County Public Safety trunking systems, which is identified as a Motorola Type II SmartNet type of system. The system type is used by the scanner to select the proper trunking system protocol portion of the scanner software, which monitors a dedicated control channel, following talk group ID codes. The operation of the various trunking systems and their protocols are known to those skilled in the art.

Figure 10:
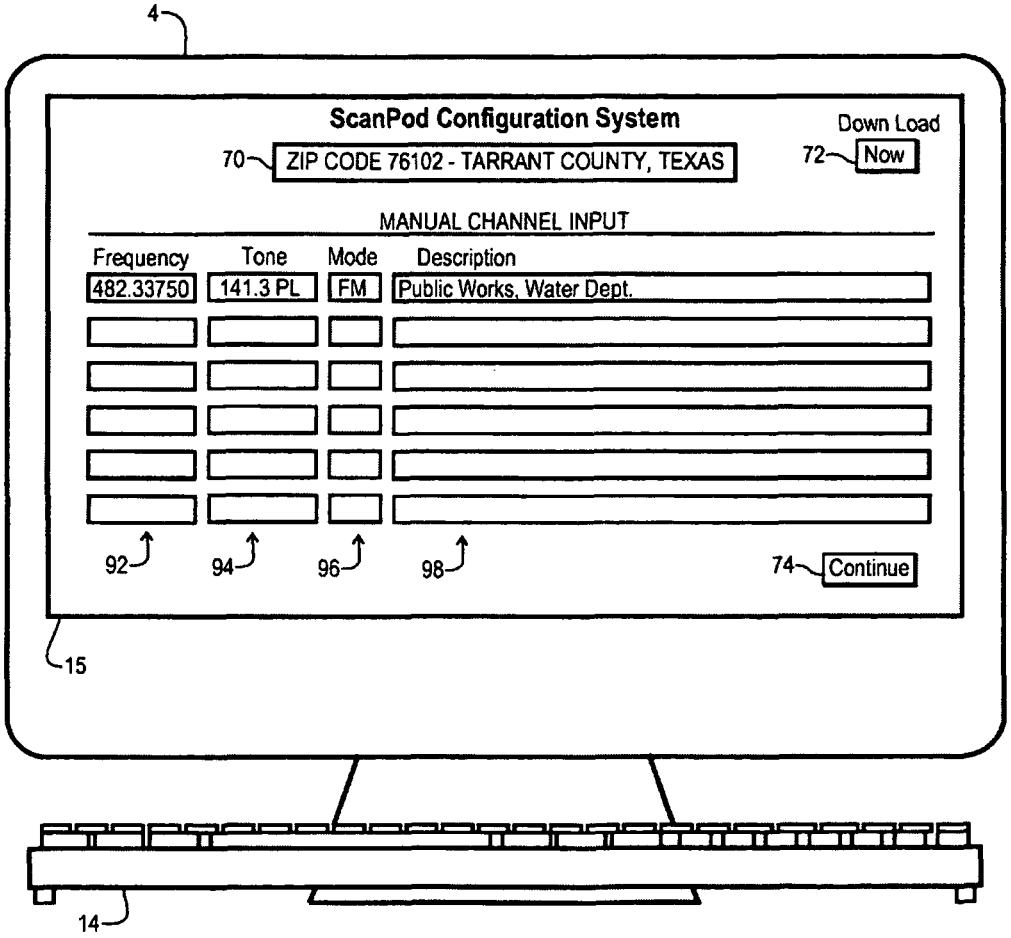
FIG. 10 is a display drawing of the computer based user interface according to an illustrative embodiment of the present invention.

Reference is directed to FIG. 10, which is a display 15 drawing of the computer 4 based user interface according to an illustrative embodiment of the present invention. FIG. 10 illustrates a user options screen provided by the application software on the screen 15 of the computer 4, which accepts inputs from the user via keyboard 14. FIG. 10 illustrates the MANUAL CHANNEL INPUT screen, which is presented only if the user made the corresponding selection in the TRANSFER OPTIONS screen, discussed above. Manual entry is desirable in the case where the user becomes aware of radio channel information that is not in the frequency and linked descriptor database. The example in FIG. 10 is for the input of conventional radio channels, however a similar screen is available for the case of trunked radio channel information as well. The user inputs a list of frequencies 92, which may or may not include a squelch tone 94, a radio mode 96, which is 'FM" modulation in the example, and a textural descriptor 98. The user's textural descriptor will be displayed on the scanner during scan a reception operation of the apparatus. The user can enter one or more manual channels, and all will be transferred to the scanner with the download option 72 is executed.

Figure 11:
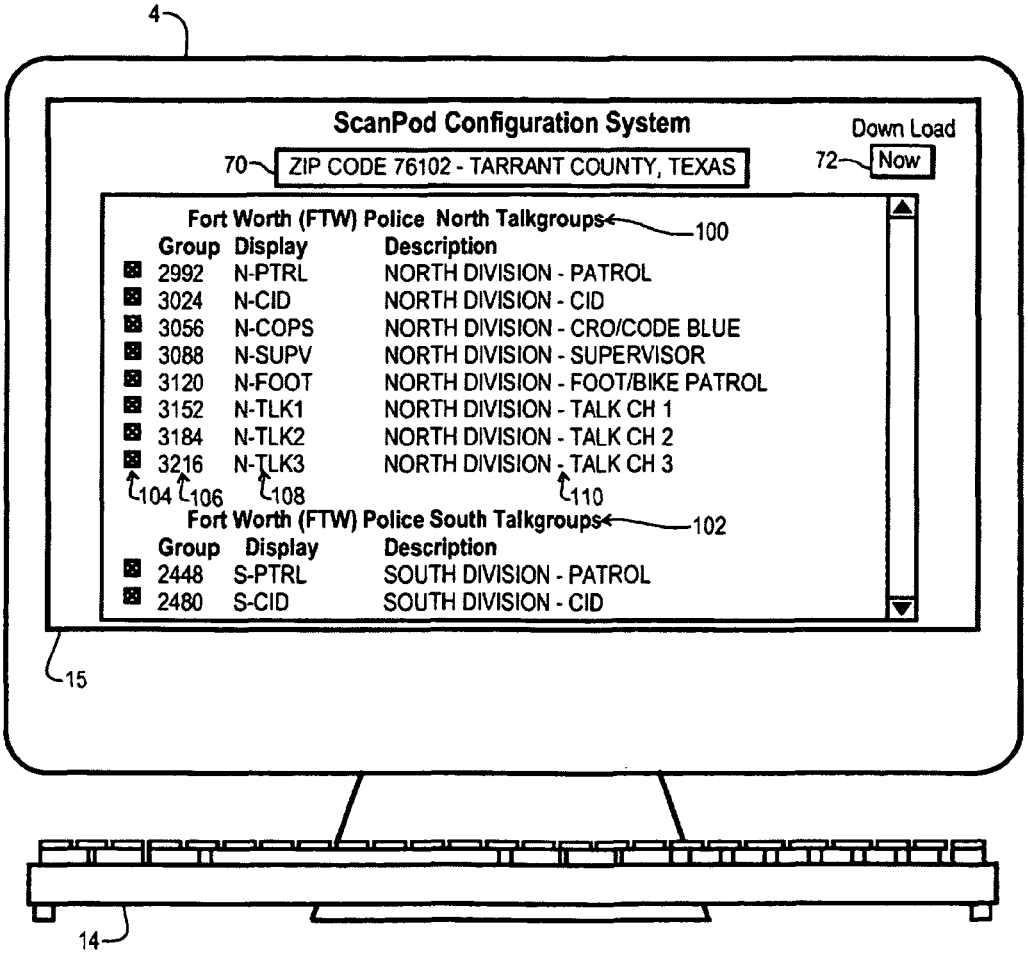
FIG. 11 is a display drawing of the computer based user interface according to an illustrative embodiment of the present invention.
Figure 12:
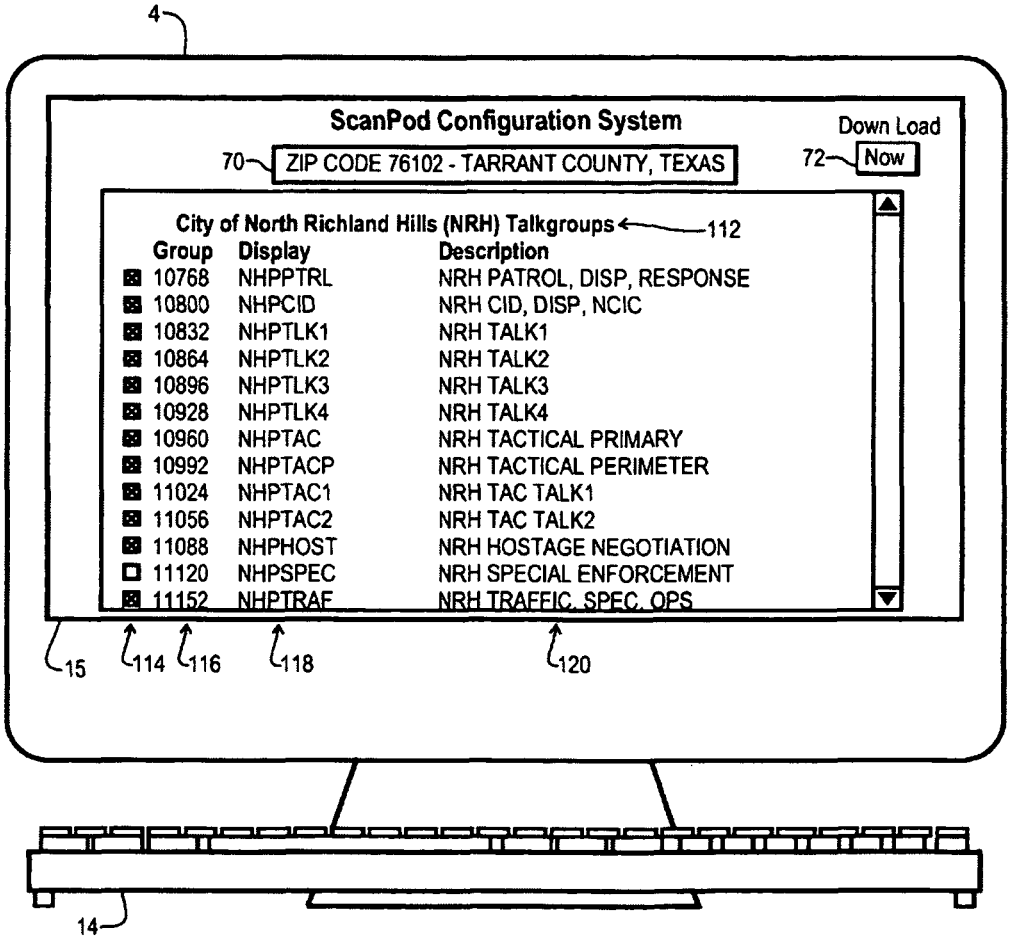
FIG. 12 is a display drawing of the computer based user interface according to an illustrative embodiment of the present invention.

Reference is directed to FIG. 11, which is a display 15 drawing of the computer 4 based user interface according to an illustrative embodiment of the present invention. FIG. 11 illustrates a user options screen provided by the application software on the screen 15 of the computer 4, which accepts inputs from the user via keyboard 14. FIG. 11 illustrates the selections offered for a trunked radio system. In a trunked system, there may be a very large number of trunk group identification codes. In a fashion similar to the enabling and disabling of frequencies discussed above, the screen in FIG. 11 allows the user to enable and disable trunked groups on a code by code basis. In FIG. 11, the Fort Worth Police North Talkgroup 100 and the Fort Worth Police South Talkgroups 102 are listed. The list includes the descriptors 110, the display abbreviation 108, the trunked group code number 106 and a column of corresponding selection boxes. When first presented, all of the groups are enabled, and the user selectively disables those that are not to be downloaded to the scanner. The group code numbers 106 are the actual numbers assigned in the trunked system. The descriptors 110 are the full textural version, which may be too long for some scanner displays. An abbreviated descriptor 108 is provided, which may be more conveniently displayed on the scanner display. However, both versions are downloaded to the scanner, so that the user may select which version will be displayed during operation. FIG. 12 is similar to FIG. 11, however, the City of North Richland Hills Talkgroups 112 are displayed in that example. In a similar fashion to the previous example, the full descriptors 120 are listed, the abbreviated descriptors 118, the group codes 116, and the selection boxes 114 are all listed for consideration by the user.

Figure 13:
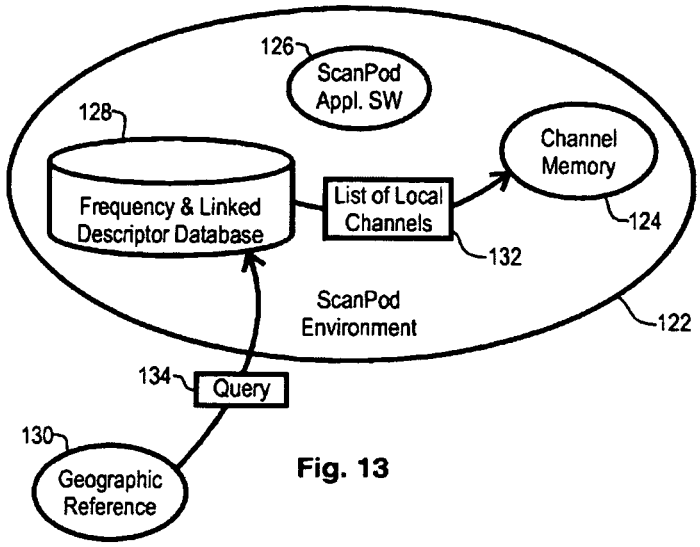
FIG. 13 is a data communications processing diagram according to an illustrative embodiment of the present invention.

Reference is directed to FIG. 13, which is a data communications processing diagram according to an illustrative embodiment of the present invention. It should be noted that the present invention contemplates a variety of system configurations, which place the frequency and linked descriptor database at various locations. These locations include a web site on the Internet, a server in a local area network, in the connected computer, and even in the scanner itself. In every case, a geographic reference is used as a database query parameters to return a list of local radio channels. The decision as to where the database is located is based on convenience, cost, and market strategy. As memory costs are reduced, multiple copies may be stored at multiple locations, even perhaps a copy in every scanner manufactured. FIG. 13 illustrates the case where the scanner is self contained with the frequency and linked descriptor database.

In FIG. 13, the ScanPod environment 122 is the software and hardware physically located in the scanning radio receiver. The entire frequency and linked descriptor database 128 is stored in the scanner data memory. A geographic reference 130 is input by the user, typically using the scanner keypad, and is used as the query 134 parameter. The query results in a list of local radio channels 132, which are stored in the channel memory 124 of the scanner. All of these functions occur under command of the ScanPod application software 126. During scanning operation of the scanner, the controller sequences through the channel memory, loading each frequency in to the receiver and checking for reception of pertinent radio broadcasts. The self-contained embodiment of FIG. 13 is beneficial in that a separate computer is not required, nor is access to a network of any kind. On the other hand, the data memory of the scanner must be sufficiently large to hold the entire database, which can be quite large for a nationally distributed product.

Figure 14:
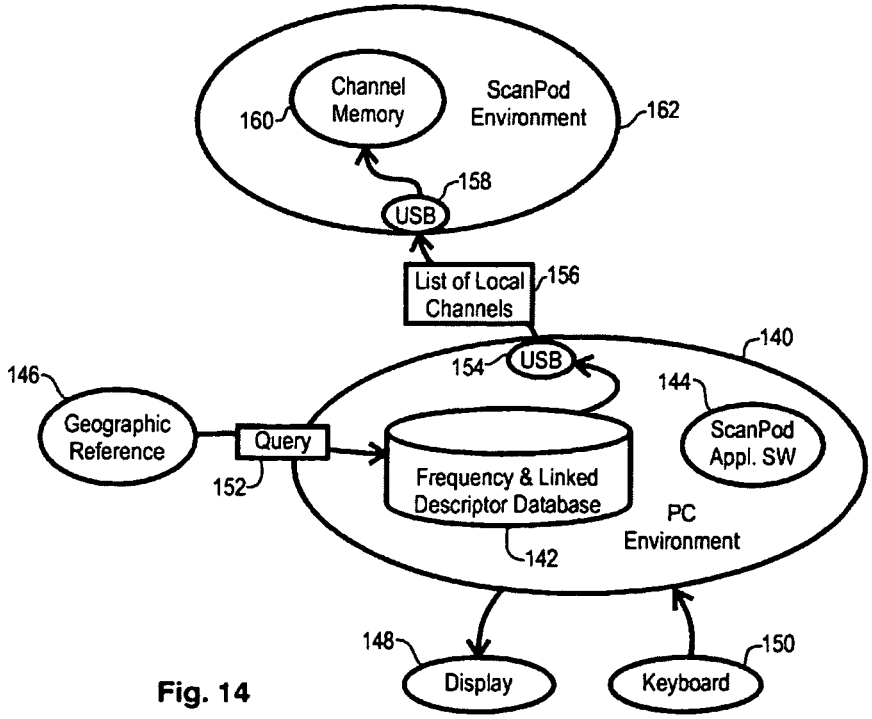
FIG. 14 is a data communications processing diagram according to an illustrative embodiment of the present invention.

Reference is directed to FIG. 14, which is a data communications processing diagram according to an illustrative embodiment of the present invention in which the frequency and linked database 142 is located in a personal computer 140 that is selectively coupled to the scanner 162. A geographic reference 146 is input to the computer using the keyboard 150 and display 148 as the man-machine interface. The geographic reference 146 is the input parameter for a database query 152 of the frequency and linked descriptor database 142, which is stored in the personal computer 140 memory. The execution of the search and subsequent processing are accomplished using the ScanPod application software 144, which executes within the computer environment 140. However, the ScanPod application software 144 is bundled with the scanner 162, and is loaded into the personal computer 140 by the user. The search result is a list of local radio channels 156, which is transferred into the channel memory 160 of the scanner 162 through the computer USB communication port 154 and the scanner interface port 158, both of which are USB compliant.

Figure 15:
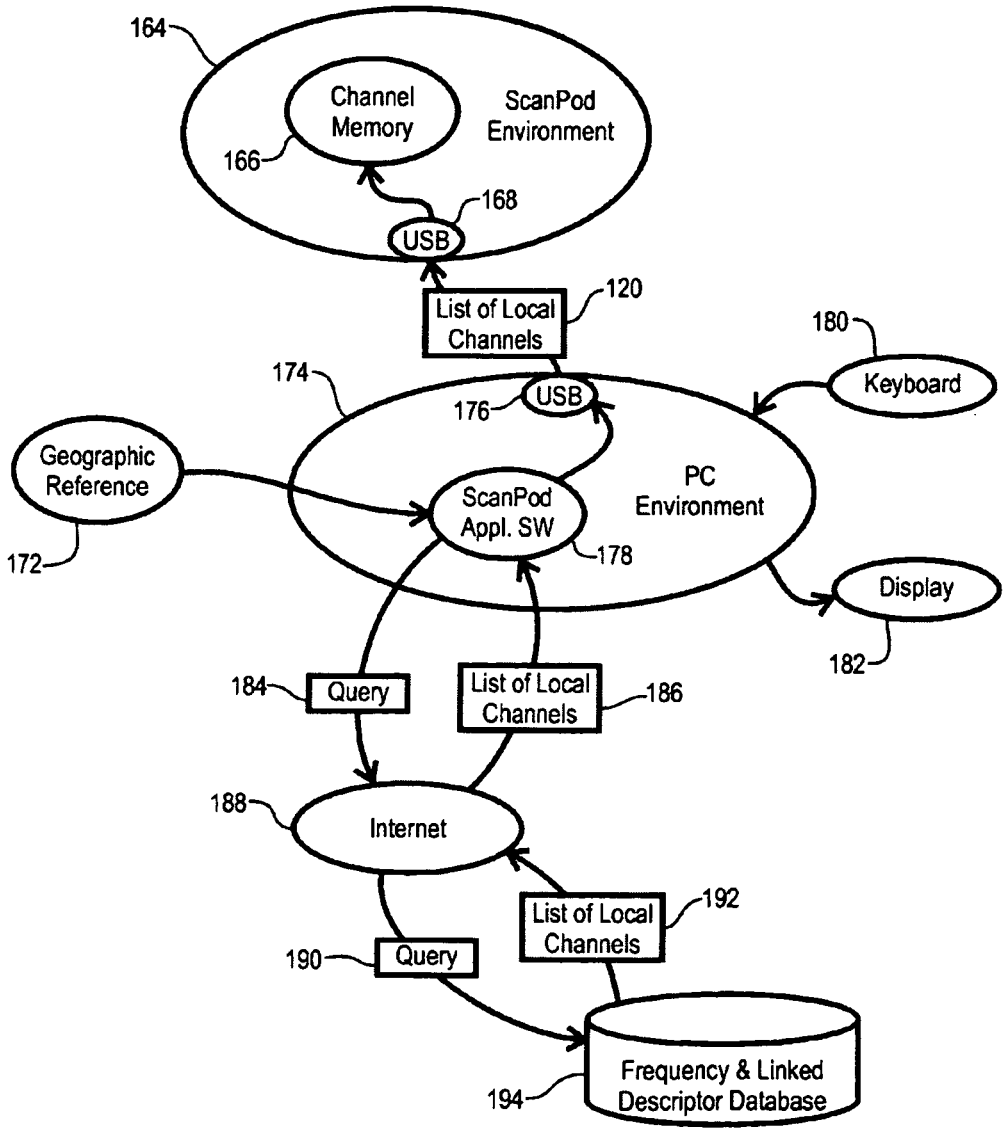
FIG. 15 is a data communications processing diagram according to an illustrative embodiment of the present invention.

Reference is directed to FIG. 15, which is a data communications processing diagram according to an illustrative embodiment of the present invention in the case where the frequency and link descriptor database 194 is located on the Internet 188, which is accessed by a personal computer 174 that is selectively coupled to a scanner 164. The geographic reference 172 is input to the computer 174 through the conventional keyboard 180 and display 182 man-machine interface. A ScanPod application software 178 has been installed in the computer 174 and accepts the geographic reference 172. The geographic reference 172 forms the basis of a database query 184 that is communicated into the Internet 188 in the customary fashion known to those skilled in the art. The Internet 188 forwards the query 190 to the frequency and linked database server 194, which executes the database query and produces the resultant list of local radio channels 192. The list of channels 192 is communicated through the Internet 188 and is returned 186 to the application software 178. Once the selection processes are completed by the user, through the computer's user interface, the scanner 164 is coupled to the computer 174 via the computer's communication port 176 and the scanner's interface port 168. The edited list of local channels 120 is then transferred into the channel memory 166 of the scanner for subsequent use in scanning operations.

Figure 16:
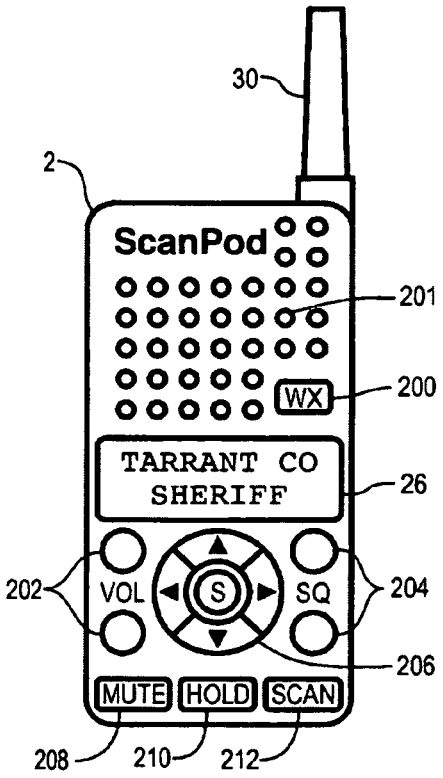
FIG. 16 is a front view of a radio scanner according to an illustrative embodiment of the present invention.

Reference is directed to FIG. 16, which is a front view of the radio scanner 2 according to an illustrative embodiment of the present invention. The scanner includes an antenna 30, which intercepts broadcast radio signals. The user interface of the scanner 2 includes a loudspeaker 201, a display 26, and various key actuators. The key actuators include a weather key 200, which causes the scanner to tune to a weather related frequency or scanning routine. Volume up and down keys 202 enable adjustment of the speaker 201 volume. A pair of squelch keys 204 allow control of carrier squelched signals. A menu navigation keypad 206 enables up-down and forward-backward navigation through a display driven menu, with a center selection key 206 of confirming user selection of menu options. In addition there is a MUTE key 208, HOLD key 210, and SCAN key 212, which provided the conventional actions of silencing the speaker, stopping the scanning process, and resuming the scanning process, respectively.

Figure 17:
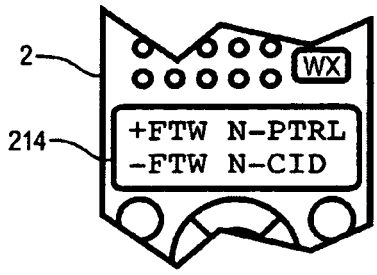
FIG. 17 is a radio scanner display drawing according to an illustrative embodiment of the present invention.
Figure 18:
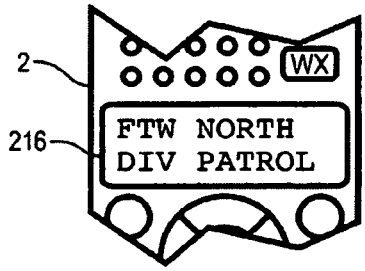
FIG. 18 is a radio scanner display drawing according to an illustrative embodiment of the present invention.
Figure 19:
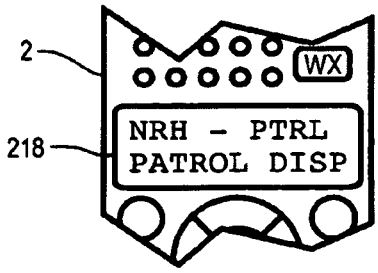
FIG. 19 is a radio scanner display drawing according to an illustrative embodiment of the present invention.

Reference is directed to FIG. 17, FIG. 18, and FIG. 19, which are radio scanner display drawings according to an illustrative embodiment of the present invention. These three figures illustrate the display modes of the scanner 2 during scanning of a trunked radio systems. In FIG. 17, the display content 214 shows the selection process for two services, Fort Worth North Patrol and Fort Worth North CID Operations. The "+" and "–" indicators on the left indicate whether that talk group code is active for scanning at the present time. The use can further scroll up and down the list of talk groups to enable and disable them using the navigation keys. FIG. 18 illustrates the display content 216 in the case where the full descriptor is used, which is "North Div. Patrol" in the illustration. FIG. 19 illustrates the display content 218 in the case where the abbreviated descriptor is used, namely "NRH-PTRL", in combination with a portion of the full descriptor on the lower line.

Figure 21:
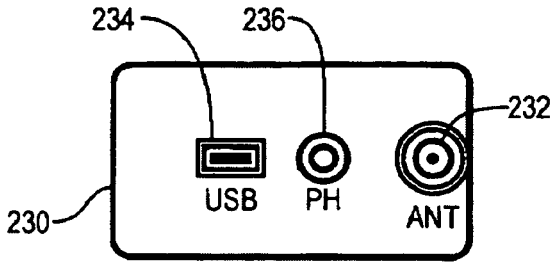
FIG. 21 is a top view of a radio scanner according to an illustrative embodiment of the present invention.
Figure 20:
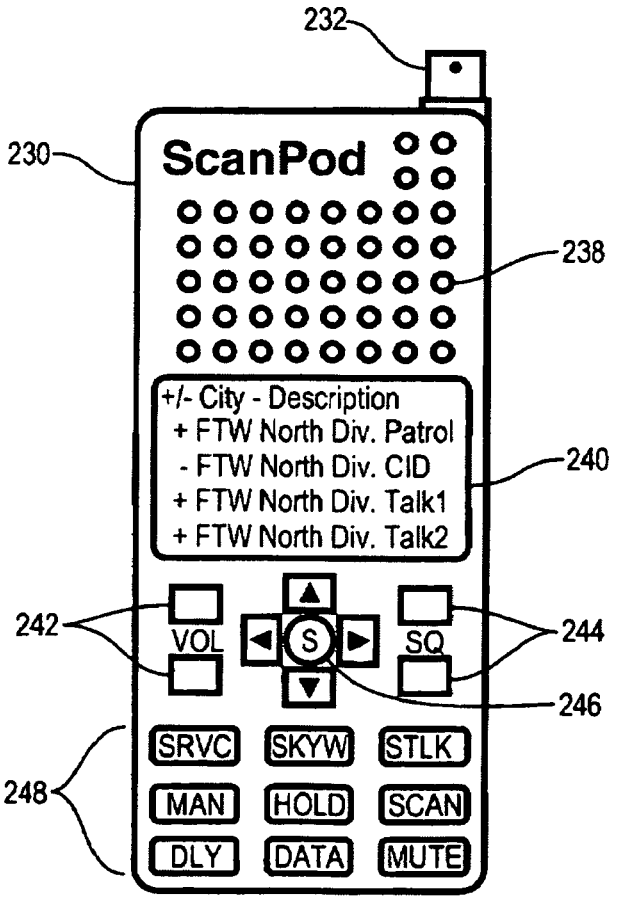
FIG. 20 is a front view of a radio scanner according to an illustrative embodiment of the present invention.

Reference is directed to FIG. 20 and FIG. 21, which are a front view and top view, respectively, of a radio scanner 230 according to an alternative illustrative embodiment of the present invention. The scanner 230 is a larger model with a more complete user interface, yet still lacks the numeric keypad of prior art scanners. The scanner 230 includes an antenna connector 232 for connecting an external antenna. A USB port 234 and headphone jack 236 are provided on the top of the scanner 230. Volume keys 242 and squelch keys 244 are provided. A menu navigation and selection keypad 246 is provided for navigation of the display 240 driven menu system. A more complete group of function keys 248 are provided, which enable single actuation access to a variety of conventional scanner functions, as are known to those skilled in the art. A larger display 240 allows for a more extensive listing of user options and functions.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

[1. A method of operating a radio having a receiver, a channel memory and a display in conjunction with a frequency and linked descriptor database available on a computer, wherein the descriptors are textural indications of a service type, and wherein the database is searchable using a geographic reference parameter, the method comprising the steps of:

coupling the radio to a communication port on the computer;

querying the frequency and linked descriptor database using a geographic reference selected from amongst a ZIP code, city name, county name and state, to produce a list of local radio channels that includes a list of frequencies with linked descriptors;

transferring said list of radio channels between the computer and the radio, and into the channel memory, and tuning the receiver to a frequency recalled from said list of radio channels while simultaneously displaying a descriptor linked to said frequency, wherein said descriptor is a textural indication of the service type received on said frequency.]

[2. The method of claim 1, further comprising the step of specifying the geographic reference.]

[3. The method of claim 1, further comprising the step of selectively enabling a portion of said list of local radio channels for transfer during said transferring step.]

[4. The method of claim 1 wherein the radio includes a database memory containing the frequency and linked descriptor database.]

[5. The method of claim 1 wherein the frequency and linked descriptor database is located on the Internet, and wherein said querying step and said transferring step are accomplished through an Internet connection.]

[6. The method of claim 1 wherein the frequency and linked descriptor database is located on a network coupled to the computer, and wherein said querying step is accomplished by the computer through the network.]

[7. The method of claim 1 wherein the radio further includes a rechargeable battery, the method further comprising the step of:

recharging the battery through the communications ports.]

[8. The method of claim 1 wherein the computer includes a user interface, the method further comprising the step of:

specifying said geographic reference through the computer user interface.]

[9. The method of claim 1 wherein the radio is provided with a computer device driver, the method further comprising the steps of:

loading the device driver onto the computer, and recognizing the connection of the radio to the computer by the device driver.]

[10. The method of claim 1 wherein the radio is provided with computer application software, the method further comprising the steps of:

loading the application software onto the computer, and executing the application software on the computer.]

[11. The method of claim 1 wherein the frequency and linked descriptor database is stored in the computer.]

[12. A radio apparatus adapted for use in conjunction with a computer having a communication port and a frequency and linked descriptor database, wherein the descriptors are textural indications of a service type, and wherein the database is searchable using a geographic reference parameter, comprising:

a receiver;

a channel memory;

a display;

an interface port adapted to communicate with the computer communication port;

a controller coupled to said receiver, said channel memory, said interface port, and said display, and wherein said controller operates to store a list of local radio channels that includes a list of frequencies with linked descriptors, which are received from the computer through said interface port, and which result from a query of the frequency and linked descriptor database using a geographic reference selected from amongst a ZIP code, city name, county name and state, into said channel memory, and wherein said controller further operates to tune said receiver to a frequency recalled from said list of radio channels and simultaneously display a descriptor linked to said frequency on said display, wherein said descriptor is a textural indication of the service type received on said frequency.]

[13. The apparatus of claim 12 wherein said geographic references is communicated through said controller during said query of the frequency and linked descriptor database.]

[14. The apparatus of claim 12, further comprising:

an actuator coupled to said controller, and wherein actuation of said actuator causes said controller to enable a selective portion of said list of local radio channels to be stored in said channel memory.]

[15. The apparatus of claim 12, further comprising:

a database memory coupled to said controller, which contains the frequency and linked descriptor database.]

[16. The apparatus of claim 12 wherein the frequency and linked descriptor database is located on the Internet, the radio further comprising:

a network interface, and wherein said controller operates to query the frequency and linked descriptor database through said network interface, and operates to receive said list of local radio channels trough said network interface.]

[17. The apparatus of claim 12, further comprising:

a battery electrically coupled to said interface port, and wherein said battery is recharged with power received from the computer communication port.]

[18. The apparatus of claim 12, further comprising:

application software adapted for execution by the computer, and wherein said application software operates to recognize the radio upon connection of said interface port to the communication port.]

[19. The apparatus of claim 18 wherein the frequency and linked descriptor database is located on a network coupled to the computer, and wherein said application software operates to cause the computer to query the frequency and linked descriptor database through the network.]

[20. The apparatus of claim 18 wherein the computer includes a user interface, and wherein said application software recognizes user input of said geographic reference through the user interface.]

21. A method of operating a scanning radio having a receiver, a channel memory and a display in conjunction with a frequency and linked descriptor database, wherein the descriptors are textural indications of a service type, and wherein the database is searchable using a geographic reference parameter, comprising the steps of:

querying the frequency and linked descriptor database using a geographic reference selected from amongst a ZIP code, city name, county name and state, to produce a list of local radio channels that includes a list of frequencies with linked descriptors;

transferring said list of local radio channels into the channel memory, and scanning said list of local radio channels by sequentially tuning the receiver to frequencies recalled from said list of frequencies stored in the channel memory while simultaneously displaying a descriptor linked to each of said recalled frequencies, wherein said descriptor is a textural indication of the service type received on said frequency *and wherein the frequency and linked descriptor database further includes trunked groups of frequencies and linked system types, and*

*wherein said list of local radio channels further include a trunked group of frequencies and a linked system type, and wherein said scanning step further includes;*

*enabling reception of said trunked group of frequencies according to a trunking protocol corresponding to said linked system type.*

22. The method of claim 21 wherein the scanner further includes a channel selection actuator, the method further comprising the step of:

selectively enabling a portion of said list of local radio channels for sequential tuning during said scanning step.

23. The method of claim 21 wherein the frequency and linked descriptor database further includes linked squelch tones, and wherein:

said list of local radio channels further include a linked squelch tone that is linked with at least a first frequency, and wherein said scanning step further includes;

comparing a presently received squelch tone with said linked squelch tone, and enabling reception of a present frequency upon detecting a match between said received squelch to and said linked squelch tone.

[24. The method of claim 21 wherein the frequency and linked descriptor database further includes trunked groups of frequencies and linked system types, and wherein:

said list of local radio channels further include a trunked group of frequencies and a linked system type, and wherein said scanning step further includes;

enabling reception of said trunked group of frequencies according to a trunking protocol corresponding to said linked system type.]

25. The method of [claim 24] *claim 21* wherein the frequency and linked descriptor database further includes linked trunked group codes, and wherein:

said list of local radio channels further includes a linked trunked group code linked to said trunked group of frequencies, and wherein said scanning step further includes;

comparing a presently received trunked group code with said linked trunked group code, and enabling reception of a trunked system radio signal by tracking the trunked group frequencies in accordance with said trunking protocol upon detecting a match between said received trunked group code and said linked trunked group code.

26. The method of claim 21 wherein the scanner further includes an interface port and is operated in conjunction with a computer having a communications port, the method further comprising the step of:

coupling the scanner interface port to the computer communication port, and wherein said transferring step transfers said list of local radio channels from the computer to the channel memory.

27. The method of claim 26 wherein the frequency and linked descriptor database is located on a network coupled to the computer, and wherein said querying step is initiated by the computer through the network.

28. The method of claim 26, further comprising the step of selectively enabling a portion of said list of local radio channels for transfer during said transferring step.

29. The method of claim 26 wherein the radio further includes a battery electrically coupled to the interface port, the method further comprising the step of:

recharging the battery with power derived from the communications port.

30. The method of claim 26 wherein the radio is provided with a computer device driver, the method further comprising the steps of:

loading the device driver onto the computer, and recognizing the connection of the radio interface port to the computer communication port by the device driver.

31. The method of claim 26 wherein the frequency and linked descriptor database is stored in the computer.

32. The method of claim 26, further comprising the steps of:

synchronizing said list of local radio channels in the computer with the present list of local radio channels in the channel memory.

33. The method of claim 26 wherein the computer includes a user interface, the method further comprising the step of:

specifying said geographic reference through the computer user interface.

34. The method of claim 33 further comprising the step of:

selectively enabling a portion of said list of local radio channels for transfer during said transferring step by access to the computer user interface.

35. The method of claim 33, further comprising the steps of:

presenting an indicia of the content of the list of local radio channels using the computer user interface, and initiating said transferring step by affirmative actuation using the computer user interface.

36. The method of claim 26 wherein the radio is provided with computer application software, the method further comprising the steps of:

loading the application software onto the computer, and executing the application software on the computer.

37. The method of claim 36 and wherein the computer application software enables selecting, adding, and deleting content from the list of local radio channels.

38. A scanning radio apparatus for use in conjunction with a frequency and linked descriptor database, wherein the descriptors are textural indications of a service type, and wherein the database searchable using a geographic reference parameter, comprising:

a receiver;

a channel memory;

a display;

a controller coupled to said receiver, said channel memory, and said display, and wherein said controller operates to store a list of local radio channels that includes a list of frequencies with linked descriptors, which result from a query of the frequency and linked descriptor, database using a geographic reference selected from amongst a ZIP code, city name, county name and state, into said channel memory, and wherein said controller further operates to sequentially tune said receiver to frequencies recalled from said list of frequencies stored in said channel memory while simultaneously displaying a descriptor linked to each of said recalled frequencies on said display, wherein said descriptor is a textural indication of the service type received on said frequency, and thereby scanning said list of frequencies*, and*

*wherein the frequency and linked descriptor database further includes trunked groups of frequencies and linked system types, and wherein;*

*said list of local radio channels further includes a trunked group of frequencies and a linked system type, and wherein said controller stores said trunked group of frequencies and said linked system type in said channel memory, and wherein*

*said controller enables reception of said trunked group of frequencies by said receiver according to a trunking protocol corresponding to said linked system type*.

39. The apparatus of claim 38, further comprising:

a channel selection actuator coupled to said controller, and wherein actuation of said channel selection actuator causes said controller selectively enable a portion of said list of local radio channels for sequential tuning during said scanning said list of frequencies operation.

40. The apparatus of claim 38 wherein the frequency and linked descriptor database further includes linked squelch tones, and wherein:

said list of local radio channels further include a linked squelch tone that is linked with at least a first frequency, and wherein said controller operates to store said linked squelch tone in said channel memory, and wherein said controller operates to compare a presently received squelch tone with said linked squelch tone during said scanning operation, and wherein said controller enables reception of a present frequency upon detecting a match between said received squelch to and said linked squelch tone.

[41. The apparatus of claim 38 wherein the frequency and linked descriptor database further includes trunked groups of frequencies and linked system types, and wherein:

said list of local radio channels further includes a trunked group of frequencies and a linked system type, and wherein said controller stores said trunked group of frequencies and said linked system type in said channel memory, and wherein said controller enables reception of said trunked group of frequencies by said receiver according to a trunking protocol corresponding to said linked system type.]

42. The apparatus of [claim 41] *claim 38* wherein the frequency and linked descriptor database further includes linked trunked group codes, and wherein:

said list of local radio channels further includes a linked trunked group code linked to said trunked group of frequencies, and wherein said controller operates to compare a presently received linked group code with said linked trunked group code during said scanning operation, and wherein said controller operates to enable said receiver to receive a trunked system radio signal by tracking the trunked group frequencies in accordance with said trunking protocol upon detecting a match between said received trunked group code and said linked trunked group code.

43. The apparatus of claim 38 adapted for use in conjunction with a computer having a communication port, and further comprising:

an interface port coupled to said controller and adapted to communicate with the computer communication port, and wherein said controller operates to receive said list of local radio channels from the computer through said interface port.

44. The apparatus of claim 43 wherein the frequency and linked descriptor database is stored in the computer.

45. The apparatus of claim 43, further comprising:

a battery electrically coupled to said interface port, and wherein said battery is recharged with power received from the computer communication port.

46. The apparatus of claim 43, further comprising:

application software adapted for execution by the computer, and wherein said application software operates to recognize the radio upon connection of said interface port to the communication port.

47. The apparatus of claim 46 wherein the frequency and linked descriptor database is located on a network coupled to the computer, and wherein said query of the frequency and linked descriptor database is initiated by the computer through the network.

48. The apparatus of claim 46 and wherein said controller and said application software operate to synchronize said list of local radio channels in the computer with the present list of local radio channels in the channel memory.

49. The apparatus of claim 46 wherein the computer includes a user interface, and wherein said geographic reference is specified through the computer user interface.

50. The apparatus of claim 49 and wherein a portion of said list of local radio channels is selectively enabled for transfer by said application software through interface with the computer user interface.

51. The apparatus of claim 49 and wherein said application software presents an indicia of the content of said list of local radio channels using the computer user interface, and the transfer of said list of local channels to said channel memory occurs upon an affirmative actuation using the computer user interface.

52. The apparatus of claim 49 and wherein said application software enables selecting, adding, and deleting content from said list of local radio channels.

*53. A method of operating a scanning radio having a receiver, a channel memory and a display in conjunction with a frequency and linked descriptor database, wherein the descriptors are textural indications of a service type, and wherein the database is searchable using a geographic reference parameter, comprising the steps of:*

*querying the frequency and linked descriptor database using a geographic reference selected from amongst a ZIP code, city name, county name and state, to produce a list of local radio channels with corresponding linked descriptors, and that includes a list of frequencies;*

*transferring said list of local radio channels into the channel memory, and*

*scanning said list of local radio channels by sequentially tuning the receiver to frequencies recalled from said list of frequencies stored in the channel memory that correspond to each presently scanned radio channel while simultaneously displaying a descriptor linked to each presently scanned radio channel, wherein said descriptor is a textural indication of the service type received on each radio channel, and*

*wherein the frequency and linked descriptor database further includes trunked groups of frequencies and linked system types, and wherein;*

*said list of local radio channels further include a trunked group of frequencies and a linked system type, and wherein said scanning step further includes;*

*enabling reception of said trunked group of frequencies according to a trunking protocol corresponding to said linked system type.*

*54. The method of claim 53 wherein the scanning radio receiver further includes a channel selection actuator, the method further comprising the step of:*

*selectively enabling a portion of said list of local radio channels for sequential tuning during said scanning step.*

*55. The method of claim 53 wherein the frequency and linked descriptor database further includes linked squelch tones, and wherein:*

*said list of local radio channels further include a linked squelch tone that is linked with at least a local radio channel, and wherein said scanning step further includes;*

*comparing a presently received squelch tone with said linked squelch tone, and*

*enabling reception of a present local radio channel upon detecting a match between said received squelch tone to and said linked squelch tone.*

*56. The method of claim 53 wherein the frequency and linked descriptor database further includes linked trunked group codes, and wherein:*

*said list of local radio channels further includes a linked trunked group code linked to said trunked group of frequencies, and wherein said scanning step further includes;*

*comparing a presently received trunked group code with said linked trunked group code, and*

*enabling reception of a trunked system radio signal by tracking the trunked group frequencies in accordance with said trunking protocol upon detecting a match between said received trunked group code and said linked trunked group code.*

*57. The method of claim 53 wherein the scanner further includes an interface port and is operated in conjunction with a computer having a communications port, the method further comprising the step of:*

*coupling the scanner interface port to the computer communication port, and*

*accessing network located frequency and linked descriptor database to update said frequency and linked descriptor database.*

*58. The method of claim 57 wherein the radio is provided with a computer device driver, the method further comprising the steps of:*

*loading the device driver onto the computer, and*

*recognizing the connection of the radio interface port to the computer communication port by the device driver.*

*59. The method of claim 57 wherein the radio is provided with computer application software, the method further comprising the steps of:*

*loading the application software onto the computer, and*

*executing the application software on the computer.*

*60. A scanning radio apparatus for use in conjunction with a frequency and linked descriptor database, wherein the descriptors are textural indications of a service type, and*

*wherein the database is searchable using a geographic reference parameter, comprising:*

*a receiver;*

*a channel memory;*

*a display;*

*a controller coupled to said receiver, said channel memory, and said display, and wherein said controller operates to store a list of local radio channels with corresponding linked descriptors, and that includes a list of frequencies, which result from a query of the frequency and linked descriptor database using a geographic reference selected from amongst a ZIP code, city name, county name and state, into said channel memory, and wherein*

*said controller further operates to scan said list of local radio channels by sequentially tuning said receiver to frequencies recalled from said list of frequencies stored in said channel memory that correspond to each presently scanned radio channel while simultaneously displaying a descriptor linked to each presently scanned radio channel, wherein said descriptor is a textural indication of the service type received on each radio channel, and*

*wherein the frequency and linked descriptor database further includes trunked groups of frequencies and linked system types, and wherein;*

*said list of local radio channels further includes a trunked group of frequencies and a linked system type, and wherein said controller stores said trunked group of frequencies and said linked system type in said channel memory, and wherein*

*said controller enables reception of said trunked group of frequencies by said receiver according to a trunking protocol corresponding to said linked system type.*

*61. The apparatus of claim 60, further comprising:*

*a channel selection actuator coupled to said controller, and wherein*

*actuation of said channel selection actuator causes said controller to selectively enable a portion of said list of local radio channels for sequential reception during said scanning said list of local radio channels operation.*

*62. The apparatus of claim 60 wherein the frequency and linked descriptor database further includes linked squelch tones, and wherein:*

*said list of local radio channels further include a linked squelch tone that is linked with at least a first local radio channel, and wherein said controller operates to store said linked squelch tone in said channel memory, and wherein*

*said controller operates to compare a presently received squelch tone with said linked squelch tone during said scanning operation, and wherein*

*said controller enables reception of a present local radio channel upon detecting a match between said received squelch tone and said linked squelch tone.*

*63. The apparatus of claim 62 wherein the frequency and linked descriptor database further includes linked trunked group codes, and wherein:*

*said list of local radio channels further includes a linked trunked group code linked to said trunked group of frequencies, and wherein*

*said controller operates to compare a presently received trunked group code with said linked trunked group code during said scanning operation, and wherein*

*said controller operates to enable said receiver to receive a trunked system radio signal by tracking the trunked group frequencies in accordance with said trunking protocol upon detecting a match between said received trunked group code and said linked trunked group code.*

*64. The apparatus of claim 63, further comprising:*

*application software adapted for execution by the computer, and wherein*

*said application software operates to recognize the radio upon connection of said interface port to the communication port.*

*65. The apparatus of claim 60 adapted for use in conjunction with a computer having a communication port, and further comprising:*

*an interface port coupled to said controller and adapted to communicate with the computer communication port, and wherein*

*said controller operates to access a network located frequency and linked descriptor database to update said frequency and linked descriptor database from the computer through said interface port.*

* * * * *